United States Patent
Ji et al.

(10) Patent No.: US 11,787,750 B1
(45) Date of Patent: Oct. 17, 2023

(54) FERTILIZERS FOR DELAYING DECAY OF HUANGLONGBING-AFFECTED TREE AND PREPARATION METHODS THEREOF

(71) Applicant: INSTITUTE OF SOIL, FERTILIZER, RESOURCES AND ENVIRONMENT OF JIANGXI ACADEMY OF AGRICULTURAL SCIENCES, Jiangxi (CN)

(72) Inventors: Jianhua Ji, Nanchang (CN); Xiumei Liu, Nanchang (CN); Zengbing Liu, Nanchang (CN); Hongqian Hou, Nanchang (CN); Zhenzhen Lyu, Nanchang (CN); Xianjin Lan, Nanchang (CN); Yiren Liu, Nanchang (CN)

(73) Assignee: INSTITUTE OF SOIL FERTILIZER, RESOURCES AND ENVIRONMENT OF JIANGXI ACADEMY OF AGRICULTURAL SCIENCES, Nanchang (CN)

( * ) Notice: Subject to any disclaimer, the term of this patent is extended or adjusted under 35 U.S.C. 154(b) by 0 days.

(21) Appl. No.: 18/182,296

(22) Filed: Mar. 10, 2023

(30) Foreign Application Priority Data

Mar. 11, 2022 (CN) .......................... 202210241702.3
Mar. 11, 2022 (CN) .......................... 202210241860.9

(51) Int. Cl.
*C05G 3/60* (2020.01)
*C05G 3/40* (2020.01)
*C05B 7/00* (2006.01)
*A01N 47/30* (2006.01)

(52) U.S. Cl.
CPC .............. *C05G 3/60* (2020.02); *A01N 47/30* (2013.01); *C05B 7/00* (2013.01); *C05G 3/44* (2020.02)

(58) Field of Classification Search
CPC ............ C05G 3/60; C05G 3/44; A01N 47/30; C05B 7/00
See application file for complete search history.

(56) References Cited

U.S. PATENT DOCUMENTS

2013/0281298 A1   10/2013   Liptay et al.

FOREIGN PATENT DOCUMENTS

| CN | 104529644 A | 4/2015 |
|---|---|---|
| CN | 105454300 A | 4/2016 |
| CN | 106748468 A | 5/2017 |
| CN | 107522551 A | 12/2017 |
| CN | 109111324 A | 1/2019 |
| CN | 109336686 A | 2/2019 |
| WO | 2021217721 A1 | 11/2021 |

OTHER PUBLICATIONS

First Office Action in Chinese Application No. 202210241702.3 dated Aug. 25, 2022, 15 pages.
Decision to Grant a Patent in Chinese Application No. 202210241702.3 dated Nov. 7, 2022, 6 pages.
First Office Action in Chinese Application No. 202210241860.9 dated Sep. 22, 2022, 16 pages.

*Primary Examiner* — Monica A Shin
(74) *Attorney, Agent, or Firm* — METIS IP LLC

(57) ABSTRACT

One or more embodiments of the present disclosure provide a special water-soluble fertilizer for delaying decay of a Huanglongbing (HLB)-affected tree. The raw materials of the special water-soluble fertilizer may include, in parts by weight, 3-5.5 parts of ammonium polyphosphate, 7.0-12 parts of ammonium nitrate phosphorus, 13-22 parts of potassium nitrate, 7.5-13.5 parts of ammonium sulfate, 0.8-1.5 parts of urea, 10.5-18 parts of EDTA chelated calcium, 12-21 parts of calcium magnesium nitrate, 3.5-7 parts of citric acid and 150-400 parts of straw vinegar; and a solid content of the straw vinegar may be greater than or equal to 15%. The raw materials may further include 1.3-2.5 parts of EDTA chelated manganese and 1.5-3 parts of manganese sulfate monohydrate. The raw materials may further include 0.25-0.5 part of disodium tetraborate pentahydrate.

5 Claims, No Drawings

FERTILIZERS FOR DELAYING DECAY OF HUANGLONGBING-AFFECTED TREE AND PREPARATION METHODS THEREOF

CROSS-REFERENCE TO RELATED APPLICATIONS

This application claims priority to Chinese Patent Application No. 202210241702.3, filed on Mar. 11, 2022, and Chinese Patent Application No. 202210241860.9, filed on Mar. 11, 2022, the entire contents of each of which are hereby incorporated by reference.

TECHNICAL FIELD

The disclosure belongs to the field of plant disease prevention and control, and more particularly, relates to special fertilizers for delaying decay of a Huanglongbing (HLB)-affected tree and preparation methods thereof.

BACKGROUND

Citrus is one of the most economically valuable and widely grown fruits in the world, and China is the major region for producing citrus. However, the quality of soil has declined sharply in recent years due to unreasonable fertilization and improper practices in agricultural management. The deterioration of the soil quality environment not only leads to the decline of plant disease resistance and the outbreak of Huanglongbing (HLB) (also known as citrus greening), but also significantly reduces the yield and quality of citrus.

HLB, the "cancer" of citrus, is the most harmful citrus disease in the world, causing huge losses to the citrus industry. At present, HLB has endangered the major citrus producing regions in China, Florida and California, USA, St. Paulo, Brazil and other important citrus producing regions. HLB mainly harms the main varieties and types of mandarin oranges, tangerines, oranges, lemons, pomelo, etc., especially the varieties with weak disease tolerance such as tangerine oranges, sugar oranges, Ponkan mandarins, tangerines produced in Fujian Province, and Chachi oranges. Diseased varieties may generally have symptoms of uniform etiolation, mottled etiolation, and deficiency etiolation. Adult trees often have etiolation at the top of a small number of branches in the entire orangery. The yellowing branches expand to the whole trees in the second year, making the tree decay. The fruits of the diseased trees are small, strange in shape, or crooked in the navel. The surfaces of the diseased fruits are smooth, dull, sour in taste, and yellow-green in color. Some varieties, known as "red nose fruits", are orange-red near the fruit pedicles, which affects the yield and quality of citrus. HLB is extremely harmful to citrus. The diseased varieties may lose their fruiting ability or even die within 3-5 years. In recent years, the affected areas as well as the spread rate of the HLB have increasing, doing extremely serious losses and becoming a devastating disease of citrus production.

HLB is a bacterial disease caused by a Gram-negative bacterium "*Candidatus Liberibacter asiaticus*" parasitic in the phloem tissue of plants with the citrus psyllid as the main vector. HLB reduces the transport of photosynthetic products, and the accumulation of photosynthetic products affects the flow of other nutrients, resulting in the inhibition of citrus growth. The outbreak of HLB may be related to various factors. Plant-associated microbiota may directly or indirectly affect the diversity and stability of citrus resistance to HLB by changing microbial species, and play a vital role in various physiological and biochemical processes of plants. In addition, the balance of mineral nutrients in plants improves the resistance of plants. Some citrus varieties show strong resistance to HLB. Besides, the climate and environmental conditions of citrus growing regions may affect the spread of HLB. So far, the techniques of digging out diseased trees, applying chemical pesticides, and performing hybridization and transgenic technology are the main strategies for controlling HLB, which may also bring a series of problems, such as environmental pollution, long cycle and high cost. Therefore, it is desirable to find environmentally-friendly and practical methods to prevent HLB. Macronutrients and micronutrients are irreplaceable for plant growth, some of which may be beneficial for plant disease prevention, and play a role in activating plant immune system by altering microbial community structure and metabolic pathways.

SUMMARY

The purpose of the present disclosure is to solve the deficiencies in the prior art, and provide a special fertilizer for delaying decay of a Huanglongbing (HLB)-affected tree, specifically adopting the following technical solution.

One embodiment of the present disclosure provides a granular fertilizer for delaying decay of a Huanglongbing (HLB)-affected tree. The raw materials of the granular fertilizer may include, in parts by weight, 4.58-8.9 parts of diammonium phosphate, 7.4-15.3 parts of ammonium nitrate phosphorus, 14-25 parts of potassium nitrate, 7.5-15 parts of ammonium sulfate, 0.9-2.5 parts of urea, 4.5-10 parts of calcium carbonate, 20-40 parts of calcium magnesium nitrate, and 2.5-7.5 parts of manganese sulfate.

During the onset of HLB, citrus may show some symptoms of nutrient deficiency, so some skilled person supplements nutrient elements to alleviate these symptoms, which is "treating the symptom but not the cause". The inventor has carried out in-depth research on how to inhibit or limit the pathogenic bacteria of HLB (*Candidatus Liberibacter asiaticus*), and found that excessive manganese (3 times more than the general amount) can well inhibit the number of pathogenic bacteria of HLB in the root system of citrus, thereby realizing the effect of delaying the decay of the HLB-affected tree, which can "treat the cause" to a certain extent.

In some embodiments, the raw materials of the granular fertilizer may include, in parts by weight, 4.58-6.86 parts of diammonium phosphate, 7.4-11 parts of ammonium phosphorus nitrate, 14-21 parts of potassium nitrate, 7.5-11.5 parts of ammonium sulfate, 0.9-1.3 parts of urea, 4.5-7 parts of calcium carbonate, 20-32 parts of calcium magnesium nitrate, and 2.5-4.5 parts of manganese sulfate. The inventor also found that on the basis of adding excessive manganese, if the amount of nitrogen, phosphorus, and potassium is reduced to a certain extent (reduce 30-50% relative to the general amount), the number of bacteria in the citrus root system can decrease more obviously.

In some embodiments, the raw materials of the granular fertilizer may further include 0.35-0.7 part of borax. The inventor also found that adding excessive amount of boron (an increase of 300% relative to the general amount) can well inhibit the number of pathogenic bacteria of HLB in the scion.

In some embodiments, the raw materials of the granular fertilizer may further include 0.12-0.22 part of copper sulfate, 3.5-6.5 parts of ferrous sulfate, 1.3-2.5 parts of chelated iron, 0.01-0.02 part of ammonium molybdate, and 2.8-5.5 parts of zinc sulfate. After adding iron, zinc, copper, molybdenum and other trace elements, the effect can be further improved. In the second year, the tree vigor of HLB-affected trees may be significantly restored, and high yield and high quality may be achieved.

In some embodiments, the borax may be sodium borate decahydrate, the copper sulfate may be copper sulfate pentahydrate, the ferrous sulfate may be ferrous sulfate heptahydrate, the chelated iron may be EDTA chelated iron, the manganese sulfate may be manganese sulfate monohydrate, the ammonium molybdate may be ammonium heptamolybdate, and the zinc sulfate may be zinc sulfate heptahydrate.

The preparation method of the granular fertilizer may comprise: pulverizing diammonium phosphate, ammonium phosphorus nitrate, potassium nitrate, ammonium sulfate, and urea, evenly mixing and then granulating under the action of a binder to obtain a granule 1; pulverizing calcium carbonate and calcium magnesium nitrate, evenly mixing and then granulating under the action of a binder to obtain a granule 2; pulverizing borax, copper sulfate, chelated iron, ferrous sulfate, manganese sulfate, and zinc sulfate, evenly mixing and then being sprayed with ammonium molybdate, and then granulating under the action of a binder to obtain a granule 3; and obtaining the granular fertilizer by evenly mixing the granule 1, the granule 2 and the granule 3.

A slow controlled release fertilizer is a new type of fertilizer. Nutrients may release slowly and continuously through coating and other ways, avoiding the waste of fertilizer nutrients and improving the nutrient efficiency of the fertilizer. Accordingly, the disclosure further provides a slow controlled release granular fertilizer for delaying decay of an HLB-affected tree. The raw materials of the slow controlled release granular fertilizer may include, in parts by weight, 5.6-14.12 parts of coated diammonium phosphate, 7.5-11.8 parts of granular ammonium phosphorus nitrate, 15-30 parts of coated potassium nitrate, 8.5-13.5 parts of coated ammonium sulfate, 1-10 parts of coated urea, 5.05-8.5 parts of granular calcium carbonate, 22.5-37.5 parts of coated calcium magnesium nitrate, 2.8-4 parts of coated manganese sulfate, and 0.4-0.7 part of granular water-soluble manganese sulfate.

In some embodiments, the raw materials of the slow controlled release granular fertilizer may include, in parts by weight, 5.6-14.12 parts of coated diammonium phosphate, 7.5-11.8 parts of granular ammonium phosphorus nitrate, 15-30 parts of coated potassium nitrate, 8.5-13.5 parts of coated ammonium sulfate, 1-10 parts of coated urea, 5.05-8.5 parts of granular calcium carbonate, 22.5-37.5 parts of coated calcium magnesium nitrate, 2.8-6 parts of coated manganese sulfate, and 0.4-1 part of granular water-soluble manganese sulfate.

In some embodiments, the raw materials of the slow controlled release granular fertilizer may further include 0.41-0.68 part of coated borax.

In some embodiments, the raw materials of the slow controlled release granular fertilizer may further include 0.15-0.25 part of granular copper sulfate, 0.5-0.83 part of granular water-soluble ferrous sulfate, 1.5-2.5 parts of granular chelated iron, 3.5-5.8 parts of coated ferrous sulfate, 0.01-0.02 part of granular ammonium molybdate, 0.18-0.35 part of granular water-soluble zinc sulfate, and 3.1-5.1 parts of coated zinc sulfate.

The slow controlled release granular fertilizer may be prepared by mixing the above raw materials. In some embodiments, a particle size of the granular fertilizer and the coated fertilizer may be within a range of 1-2 mm. The coated fertilizer may be resin coated. In some embodiments, the granular copper sulfate, the granular water-soluble ferrous sulfate, the granular chelated iron, the granular water-soluble manganese sulfate, the granular ammonium molybdate, and the granular water-soluble zinc sulfate may be respectively prepared by copper sulfate pentahydrate, ferrous sulfate heptahydrate, EDTA chelated iron, manganese sulfate monohydrate, ammonium heptamolybdate, and zinc sulfate heptahydrate which may be pulverized and then granulated under the action of a binder.

Based on the above granular fertilizer, the disclosure further provides a method of using a granular fertilizer for delaying decay of a Huanglongbing (HLB)-affected tree. The fertilizer may be used according to a process specifically including the following operations.

The granular fertilizer may be applied to the citrus HLB-affected tree for three times. In the first fertilization, the granular fertilizer may be used as a base fertilizer, and a standard fertilization dose may be 1-2 kg/plant. In the second fertilization, the granular fertilizer may be used in an early flowering period, and a standard fertilization dose may be 0.5-1.5 kg/plant. In the third fertilization, the granular fertilizer may be used in a fruit enlargement growth period, and a standard fertilization dose may be 1.5-2.5 kg/plant. Alternatively, the slow controlled release granular fertilizer may be applied to the citrus HLB-affected tree as the base fertilizer once, and a standard fertilization dose may be 1-4 kg/plant.

The granular fertilizer and the fertilization method thereof may be suitable for citrus, oranges and tangerines, Nanfeng tangerines and navel oranges.

The beneficial effects of the granular fertilizer may be as follows.

(1) The excessive manganese may inhibit the number of bacteria HLB in the citrus root system, and the inhibitory effect can be better if the nitrogen, phosphorus, and potassium are reduced by 30-50%. Accordingly, the granular fertilizer may achieve the effect of "treating the cause" and delaying the decay of the HLB-affected tree. (2) Continuous application of the granular fertilizer can greatly increase the yield of Gannan navel oranges and significantly improve the quality of the navel oranges. (3) Compared with conventional special fertilizers for citrus, the slow controlled release granular fertilizer can effectively reduce the level of pathogenic bacteria of HLB in the citrus trees, greatly relieving the symptoms of HLB, promoting root growth, and accordingly obviously restoring the tree vigor by adding a large amount of slow release manganese, slow release boron, and slow release zinc. (4) Compared with existing prevention and control measures (digging out diseased trees, preventing psyllids, and administrating tetracycline) for citrus HLB, the citrus granular fertilizer not only provides sufficient nutrition for citrus trees, but is also convenient, efficient, low in cost, effective, green and pollution-free.

The purpose of the present disclosure is to solve the deficiencies in the prior art, and further provide a special water-soluble fertilizer for delaying decay of a Huanglongbing (HLB)-affected tree, specifically adopting the following technical solution.

The disclosure provides a special water-soluble fertilizer for delaying the decay of the HLB-affected tree. The raw materials of the special water-soluble fertilizer may include, in parts by weight, 3-5.5 parts of ammonium polyphosphate, 7.0-12 parts of ammonium phosphorus nitrate, 13-22 parts of potassium nitrate, 7.5-13.5 parts of ammonium sulfate, 0.8-1.5 parts of urea, 10.5-18 parts of EDTA chelated calcium, 12-21 parts of calcium magnesium nitrate, 3.5-7 parts of citric acid, and 150-400 parts of straw vinegar. A solid content of the straw vinegar may be greater than or equal to 15%.

The straw vinegar is a by-product produced in the process of producing biochar from crop straw. It has been widely used in various fields of agriculture, and can be used as a soil improver, a plant growth regulator, and can also replace synthetic pesticides for the prevention and control of plant diseases and insect pests. Existing studies have shown that the straw vinegar has obvious inhibitory effects on Candida albicans, Candida tropicalis, Aspergillus niger, Escherichia coli, Staphylococcus aureus and many other pathogenic bacteria, but it has not been found to kill or inhibit HLB bacteria according to relevant reports. After in-depth research, the inventor found that when the solid content of the straw vinegar is greater than or equal to 15%, the number of HLB bacteria in the root system can be significantly reduced. Accordingly, the inventor designed the special water-soluble fertilizer for delaying the decay of the HLB-affected tree. The straw vinegar may be rice straw vinegar, wheat straw vinegar, corn straw vinegar or rice husk vinegar.

In some embodiments, the raw materials of the special water-soluble fertilizer may further include 1.3-2.5 parts of EDTA chelated manganese and 1.5-3 parts of manganese sulfate monohydrate. When adding excessive manganese (3 times more than the general amount), the number of HLB pathogenic bacteria in the citrus root system can be greatly inhibited, thereby realizing the effect of delaying the decay of HLB-affected tree body, which can "treat the cause" to a certain extent. Besides, it is also found that if the amount of nitrogen, phosphorus, and potassium is reduced by a certain amount (30-50% relative to the general amount) on the basis of adding excessive manganese, the number of bacteria causing HLB in the citrus root system may decrease more obviously. Accordingly, the inventor compounded the components with the straw vinegar with the solid content greater than or equal to 15%, which can further enhance the inhibitory effect on HLB pathogenic bacteria in the root system. Compared with the single administration of excessive manganese, the compounded special water-soluble fertilizer can take effect faster, the bacteria causing HLB in the root system can be detected to be negative in the second year after applying the water-soluble fertilizer, the tree vigor can be obviously restored, thus achieving high yield and high quality.

In some embodiments, the raw materials of the special water-soluble fertilizer may further include 0.25-0.5 part of disodium tetraborate pentahydrate. The inventor also found that adding excessive amount of boron (an increase of 300% relative to the general amount) may well inhibit the number of bacteria causing HLB in the scion.

In some embodiments, the raw materials of the special water-soluble fertilizer may further include 0.2-0.4 part of EDTA chelated copper, 6-10.5 parts of DTA chelated iron, 0.01-0.02 part of ammonium molybdate heptahydrate, 3.5-6 parts of EDTA chelated zinc, 0.5-2 parts of trichlorocarban, and 2-3.5 parts of solubilizer. The effect can be further improved after iron, zinc, copper, molybdenum and other trace elements are added and triclocarban is added as an auxiliary fungicide. The HLB-affected tree may be negative in the first year, the tree vigor may be significantly restored, and high yield and high quality may be achieved in the same year. The solubilizer may be nonionic surfactants such as alcohol ethoxylates (AEO), polyethylene glycol or alkylphenol ethoxylates (TX-10).

The preparation method of the special-purpose water-soluble fertilizer may include:
(i) dissolving ammonium polyphosphate, ammonium phosphorus nitrate, potassium nitrate, ammonium sulfate, urea, DTA chelated calcium, calcium magnesium nitrate, citric acid, disodium tetraborate pentahydrate, DTA chelated copper, DTA chelated iron, DTA chelated manganese, EDTA Chelated zinc, manganese sulfate monohydrate and ammonium molybdate in straw vinegar to obtain a first solution; and
(ii) dissolving triclocarban in a solubilizer to obtain a second solution, then dissolving the second solution in the first solution obtained in step (1) under the condition of stirring to obtain a third solution, and filtering the third solution to obtain the fertilizer.

The special water-soluble fertilizer may be used according to a process including: applying the fertilizer once every 15-20 days from January every year with an application standard does of 0.5-3 kg/plant; and applying the fertilizer at least 8 times before a fruit enlargement period.

The special water-soluble fertilizer may be suitable for citrus, oranges and tangerines, Nanfeng tangerines and navel oranges.

The beneficial effects of the water-soluble fertilizer may be as follows. The straw vinegar with the solid content greater than or equal to 15% can reduce the number of HLB pathogenic bacteria in the root system, and the special water-soluble fertilizer designed may well achieve the effect of "treating the cause", and delaying the decay of the HLB-affected tree. Compared with conventional specific water-soluble fertilizers for citrus, the specific water-soluble fertilizer for citrus may effectively reduce the content of HLB pathogenic bacteria in the citrus trees by adding a large amount of nutrients such as manganese, boron and zinc on the basis of wood vinegar, and using the triclocarban as the auxiliary fungicide, thereby greatly relieving the symptoms of HLB, promoting root growth, and obviously restoring the tree vigor. Compared with the existing prevention and control measures (digging out diseased trees, preventing psyllids, and applying tetracycline) for citrus HLB, the special water-soluble fertilizer may not only provide sufficient nutrition for citrus trees, but also quickly inhibit number of HLB pathogenic bacteria after fertilization, thereby greatly increasing the yield of citrus, e.g., Gannan navel oranges and significantly improving the quality of citrus. Moreover, the special water-soluble fertilizer may be convenient and efficient, low in cost, effective, green and pollution-free.

DETAILED DESCRIPTION

As used in the disclosure and the appended claims, the singular forms "a," "an," and "the" include plural referents unless the content clearly dictates otherwise. Generally speaking, the terms "comprise," "comprising", "comprises", "including", "includes", and "include," when used in this present disclosure, specify the presence of stated steps and elements, these steps and elements do not constitute an exclusive list, and the method or the device may also include other steps or elements.

Unless defined otherwise, all technical and scientific terms used herein have the same meaning as commonly understood by those having ordinary skills in the art to which the present disclosure belongs.

One or more embodiments of the present disclosure provide a special fertilizer for delaying decay of a Huanglongbing (HLB)-affected tree.

In some embodiments, the special fertilizer for delaying the decay of the HLB-affected tree may be a water-soluble fertilizer, of which the raw materials may include, in parts by weight, 3-5.5 parts of ammonium polyphosphate, 7.0-12 parts of ammonium nitrate, 13-22 parts of potassium nitrate, 7.5-13.5 parts of ammonium sulfate, 0.8-1.5 parts of urea, 10.5-18 parts of EDTA chelated calcium, 12-21 parts of calcium magnesium nitrate, 3.5-7 parts of citric acid, and 150-400 parts of straw vinegar.

In some embodiments, a solid content of the straw vinegar may be greater than or equal to 15%.

In some embodiments, the water-soluble fertilizer may further include 1.3-2.5 parts of EDTA chelated manganese, and 1.5-3 parts of manganese sulfate monohydrate.

In some embodiments, the water-soluble fertilizer may further include 0.25-0.5 part of disodium tetraborate pentahydrate (Granubor®).

In some embodiments, the water-soluble fertilizer may be applied according to a process including: applying the fertilizer to the HLB-affected tree with a dose of 0.5-3 kg/plant once every 15-20 days from January every year; wherein the fertilizer may be applied to the HLB-affected tree at least 8 times before a fruit enlargement period of the HLB-affected tree.

In some embodiments, the special fertilizer for delaying the decay of the HLB-affected tree may be a granular fertilizer. The raw materials of the granular fertilizer may include, in parts by weight, 4.58-6.86 parts of diammonium phosphate, 7.4-11 parts of ammonium phosphorus nitrate, 14-21 parts of potassium nitrate, 7.5-11.5 parts of ammonium sulfate, 0.9-1.3 parts of urea, 4.5-7 parts of calcium carbonate, 20-32 parts of calcium magnesium nitrate, 2.5-4.5 parts of manganese sulfate, and 0.35-0.7 part of borax.

In some embodiments, the raw materials of the granular fertilizer may further include, in parts by weight, 0.12-0.22 part of copper sulfate, 3.5-6.5 parts of ferrous sulfate, 1.3-2.5 parts of chelated iron, 0.01-0.02 part of ammonium molybdate, and 0.01-0.02 parts of zinc sulfate.

In some embodiments, the granular fertilizer may be applied according to a process including: applying the granular fertilizer to the citrus HLB-affected tree for three times, applying the granular fertilizer as a base fertilizer to the HLB-affected tree with a dose of 1-2 kg/plant in the first application; applying the granular fertilizer to the HLB-affected tree with a dose of 0.5-1.5 kg/plant during an early flowering period in the second application; and applying the granular fertilizer to the HLB-affected tree with a dose of 1.5-2.5 kg/plant during a fruit enlargement growth period in the third application.

In some embodiments, the special fertilizer for delaying the decay of the HLB-affected tree body may include a water-soluble fertilizer and a granular fertilizer.

In some embodiments, the water-soluble fertilizer and the granular fertilizer may be selectively applied during different growth stages of the tree according to actual use requirements. An exemplary method for applying the fertilizer may include: applying the granular fertilizer as a base fertilizer to a citrus HLB-affected tree at least once from November to February every year with an standard does of 1-2 kg/plant; and applying the water-soluble fertilizer as a topdressing fertilizer to the citrus HLB-affected tree with a standard does of 0.5-3 kg/plant once every 20-25 days from March to October every year; and applying the water-soluble fertilizer at least 7 times before a fruit enlargement period. In some embodiments of the present disclosure, the combined application of the base fertilizer and the topdressing fertilizer can make the fruit trees stronger and further delay the decay of the HLB-affected tree bodies.

In some embodiments, the special fertilizer for delaying the decay of the HLB-affected tree may be a slow release granular fertilizer. In some embodiments, the raw materials of the slow controlled release granular fertilizer may include, in parts by weight, 5.6-8 parts of coated diammonium phosphate, 7.5-11.8 parts of granular ammonium nitrate, 15-24 parts of coated potassium nitrate, 8.5-13.5 parts of coated ammonium sulfate, 1-1.65 parts of coated urea, 5.05-8.5 parts of granular calcium carbonate, 22.5-37.5 parts of coated calcium magnesium nitrate, 2.8-4 parts coated manganese sulfate, 0.4-0.7 part of granular water-soluble manganese sulfate, and 0.41-0.68 part of coated borax.

In some embodiments, the raw materials of the slow controlled release granular fertilizer may further include 0.15-0.25 part of granular copper sulfate, 0.5-0.83 parts of granular water-soluble ferrous sulfate, 1.5-2.5 parts of granular chelated iron, 3.5-5.8 parts of coated ferrous iron, 0.01-0.02 part of granular ammonium molybdate, 0.18-0.35 part of granular water-soluble zinc sulfate, and 3.1-5.1 parts of coated zinc sulfate.

In some embodiments, an application method of the slow controlled release granular fertilizer may include: applying the slow controlled release granular fertilizer to the citrus HLB-affected tree only once as a base fertilizer with an application standard of 1-4 kg/plant.

In some embodiments, the special fertilizer for delaying the decay of the HLB-affected tree may include a water-soluble fertilizer and a slow release granular fertilizer.

In some embodiments, the water-soluble fertilizer and the slow release granular fertilizer may be selectively applied at different growth stages of the tree according to actual use requirements. An exemplary fertilization method may include: applying the slow release granular fertilizer as a base fertilizer to the citrus HLB-affected tree with a dose of 0.5-2 kg/plant once from November to February every year; and applying the water-soluble fertilizer as a topdressing fertilizer to the citrus HLB-affected tree with a dose of 0.5-3 kg/plant once every 25-30 days from March to October every year, wherein the water-soluble fertilizer may be applied at least 8 times before a fruit enlargement period of the HLB-affected tree. In some embodiments of the present disclosure, the combined application of the base fertilizer and the topdressing fertilizer may be used to further delay the decay of the HLB-affected tree, and the effective components in the fertilizer may release slowly and continuously by coating components of the granular fertilizer, avoiding the waste of the fertilizer components, and improving the use efficiency of the fertilizer.

The conception of the present disclosure and the technical effects produced will be clearly and completely described hereinafter in conjunction with the embodiments, to fully understand the purpose, scheme and effect of the present disclosure.

EXAMPLES

Example 1

A slow controlled release fertilizer was prepared, of which the raw materials included, in parts by weight, 6.58 parts of coated diammonium phosphate, 9.22 parts of granular ammonium phosphorus nitrate, 20 parts of coated potassium nitrate, 11 parts of coated ammonium sulfate, 1.28 parts of coated urea, 5.63 parts of granular calcium carbonate, 28.75 parts of coated calcium magnesium nitrate, 0.62 part of coated manganese sulfate monohydrate, and 0.16 part of granular manganese sulfate monohydrate.

Example 2

A slow controlled release fertilizer was prepared, of which the raw material included, in parts by weight, 14.12 parts of coated diammonium phosphate, 8.77 parts of granular ammonium phosphorus nitrate, 30 parts of coated potassium nitrate, 12.83 parts of coated ammonium sulfate, 10 parts of coated urea, 5.63 parts of granular calcium carbonate, 28.75 parts of coated calcium magnesium nitrate, 3.1 parts of coated manganese sulfate monohydrate, and 0.5 part of granular manganese sulfate monohydrate.

Example 3

A slow controlled release fertilizer was prepared, of which the raw materials included, in parts by weight, 6.58 parts of coated diammonium phosphate, 9.22 parts of granular ammonium phosphorus nitrate, 20 parts of coated potassium nitrate, 11 parts of coated ammonium sulfate, 1.28 parts of coated urea, 5.63 parts of granular calcium carbonate, 28.75 parts of coated calcium magnesium nitrate, 3.1 parts of coated manganese sulfate monohydrate, and 0.5 part of granular manganese sulfate monohydrate.

Example 4

A slow controlled release fertilizer was prepared, of which the raw materials included, in parts by weight, 6.58 parts of coated diammonium phosphate, 9.22 parts of granular ammonium phosphorus nitrate, 20 parts of coated potassium nitrate, 11 parts of coated ammonium sulfate, 1.28 parts of coated urea, 5.63 parts of granular calcium carbonate, 28.75 parts of coated calcium magnesium nitrate, and 0.52 part of coated sodium borate.

Example 5

A slow controlled release fertilizer was prepared, of which the raw materials included, in parts by weight, 6.58 parts of coated diammonium phosphate, 9.22 parts of granular ammonium phosphorus nitrate, 20 parts of coated potassium nitrate, 11 parts of coated ammonium sulfate, 1.28 parts of coated urea, 5.63 parts of granular calcium carbonate, 28.75 parts of coated calcium magnesium nitrate, 0.52 part of coated sodium borate, 3.1 parts of coated manganese sulfate monohydrate, and 0.5 part of granular manganese sulfate monohydrate.

Example 6

A slow controlled release fertilizer was prepared, of which the raw materials included, in parts by weight, 6.58 parts of coated diammonium phosphate, 9.22 parts of granular ammonium phosphorus nitrate, 20 parts of coated potassium nitrate, 11 parts of coated ammonium sulfate, 1.28 parts of coated urea, 5.63 parts of granular calcium carbonate, 28.75 parts of coated calcium magnesium nitrate, 0.52 part of coated sodium borate, 3.1 parts of coated manganese sulfate monohydrate, 0.5 part of granular manganese sulfate monohydrate, 0.55 part of granular ferrous sulfate heptahydrate, 1.69 parts of EDTA chelated iron, 4.43 parts of coated ferrous sulfate heptahydrate, 0.16 part of copper sulfate pentahydrate, 0.01 part of ammonium heptamolybdate, 0.23 part of granular zinc sulfate heptahydrate, and 3.9 parts of coated zinc sulfate heptahydrate.

Example 7

A control group was set. A slow controlled release fertilizer was prepared, of which the raw materials included, in parts by weight, 14.12 parts of coated diammonium phosphate, 8.77 parts of granular ammonium phosphorus nitrate, 30 parts of coated potassium nitrate, 12.83 parts of coated ammonium sulfate, 10 parts of coated urea, 5.63 parts of granular calcium carbonate, and 28.75 parts of coated calcium magnesium nitrate (these are the conventional amount of nitrogen fertilizer, phosphorus fertilizer, potash fertilizer, calcium fertilizer and magnesium fertilizer in the slow controlled release fertilizer for citrus, and may also be the general level of amount used in the prior art).

Example 8 Comparison Test of Slow Controlled Release Fertilizers Prepared in Examples 1-6 and Example 7

Contrast tests were carried out on the slow controlled release fertilizers prepared in Examples 1-6 and Example 7. The tests was performed for 3 years.

Test location: Indoor of Ganzhou Citrus Science Research Institute.

Test variety: Newhall navel orange. Age of tree: 4 years. All the trees used in the tests are HLB-infected navel orange trees.

In the test, each treatment was repeated 3 times. There are 21 plots in total, with 5 navel orange trees in each plot. The plots are arranged randomly, and the first tree and the last tree in each plot are marked accordingly.

Time and method for applying the fertilizer: when applying a base fertilizer every year, spreading the slow controlled release fertilizer evenly on the ground along a drip line, and then plowing 10-20 cm to mix the fertilizer and soil evenly.

Sampling method: selecting three trees with uniform growth from each plot for yield measurement sampling during a maturity stage every year, each tree being counted separately; collecting five navel orange fruits of uniform size from four different orientations of each tree and mixing into one sample to determine quality indexes and Ct values; mixing four root samples from different orientations of each tree into one sample to determine root morphological indexes and Ct values; and mixing twelve diseased leaves from four different orientations of each tree into one sample to determine Ct values of the midveins of the leaves.

The Ct values were measured by real-time fluorescent quantitative PCR. The leaf, root and fruit samples were measured by real-time fluorescent quantitative PCR after DNA extraction. Primers used in real-time fluorescent quantitative PCR were HLBasf and HLBr, and a probe may be HLBp. DdH$_2$O and DNA extracted from healthy navel orange materials were used as a blank control and a negative control, respectively, and the DNA of infected navel oranges were used as a positive control. A 20 μL fluorescent quantitative PCR amplification system contained: 10 μL Bestar qPCR Master Mix, 8 μL ddH2O, 0.4 μL HLBasf (10 μmol/L), 0.4 μL HLBr (10 μmol/L), 0.2 μL HLBp (5 μmol/L) and 1 μL DNA solution. A Real-Time PCR instrument was used for PCR. Reaction conditions were: 95° C., 2 min, 95° C., 10 s; 60° C., 30 s, 40 cycles.

A root morphology was measured using a root scanner LA2400 and analyzed by a WinRHIZO analysis system. The fertilization conditions are shown in Table 1.

TABLE 1

| Example | Usage content | Amount of each fertilization (kg/plant) |
|---|---|---|
| Example 7 (Control group) | Normal amount of nitrogen fertilizer, phosphorus fertilizer, potassium fertilizer, calcium fertilizer and magnesium fertilizer | 2 |
| Example 1 | Reduction of nitrogen fertilizer by 33%, phosphorus fertilizer by 50%, and potassium fertilizer by 33%; Normal amount of calcium fertilizer, magnesium fertilizer and manganese fertilizer | 2 |
| Example 2 | Normal amount of nitrogen fertilizer, phosphorus fertilizer, potassium fertilizer, calcium fertilizer and magnesium fertilizer; increase of manganese fertilizer by 300% | 2 |
| Example 3 | Reduction of nitrogen fertilizer by 33%, phosphorus fertilizer by 50%, potassium fertilizer by 33%; normal amount of calcium fertilizer, and magnesium fertilizer, and increase of manganese fertilizer by 300% | 2 |
| Example 4 | Reduction of nitrogen fertilizer by 33%, phosphorus fertilizer by 50%, and potassium fertilizer by 33%; normal amount of calcium fertilizer, and magnesium fertilizer; and adding borax fertilizer to soil (borax is usually used on foliar) | 2 |
| Example 5 | Reduction of nitrogen fertilizer by 33%, phosphorus fertilizer by 50%, and potassium fertilizer by 33%; normal amount of calcium fertilizer, and magnesium fertilizer; an increase of manganese fertilizer by 300% and applying borax fertilizer to the soil. | 2 |
| Example 6 | Reduction of nitrogen fertilizer by 33%, phosphorus fertilizer by 50%, and potassium fertilizer by 33%; normal amount of calcium fertilizer and magnesium fertilizer; an increase of manganese fertilizer by 300%; adding iron, zinc, copper, molybdenum fertilizer and other trace elements, and applying borax fertilizer to the soil. | 2 |

Table 2 shows the effect of granular fertilizers on the yield of navel oranges under different fertilizers.

TABLE 2

| Example | First year (kg/plant) | Second year (kg/plant) | Third year (kg/plant) |
|---|---|---|---|
| Example 7 (Control group) | 36.45 | 35.04 | 31.97 |
| Example 1 | 34.56 | 32.14 | 29.55 |
| Example 2 | 35.12 | 33.22 | 44.19 |
| Example 3 | 32.67 | 39.50 | 49.15 |
| Example 4 | 35.01 | 36.03 | 46.85 |
| Example 5 | 36.09 | 45.48 | 55.95 |
| Example 6 | 37.18 | 47.21 | 61.06 |

Table 3 shows the effect of different granular fertilizers on the quality of navel oranges.

TABLE 3

| Example | Total sugar (%) | Soluble solid (%) | Titratable acid (%) | Vc (mg/100 g) | Edible rate (%) | Juice rate (%) | Solidity-acid ratio |
|---|---|---|---|---|---|---|---|
| Example 7 (Control group) | 5.68 | 8.20 | 0.45 | 37.50 | 52.50 | 31.40 | 18.21 |
| Example 1 | 5.31 | 8.77 | 0.51 | 35.40 | 50.20 | 30.50 | 17.20 |
| Example 2 | 8.66 | 10.91 | 0.59 | 45.70 | 70.60 | 41.70 | 18.49 |
| Example 3 | 9.72 | 12.16 | 0.57 | 46.50 | 72.70 | 43.60 | 21.34 |
| Example 4 | 9.16 | 10.78 | 0.59 | 44.20 | 68.70 | 40.50 | 18.27 |
| Example 5 | 10.24 | 13.70 | 0.60 | 50.80 | 73.10 | 47.90 | 22.84 |
| Example 6 | 10.71 | 14.62 | 0.61 | 54.40 | 75.20 | 49.50 | 23.96 |

Table 4 shows the effect of different granular fertilizers on the root system of navel oranges.

TABLE 4

| Example | Total length of root (cm) | Total area of root surface ($cm^2$) | Total volume of root ($cm^3$) | Average root diameter (mm) | Number of root tips |
|---|---|---|---|---|---|
| Example 7 (Control group) | 4556.35 | 1035.68 | 20.57 | 0.54 | 5238.17 |
| Example 1 | 4687.71 | 1117.94 | 22.09 | 0.58 | 5363.34 |
| Example 2 | 7874.87 | 1483.64 | 30.56 | 0.82 | 8778.95 |
| Example 3 | 8142.52 | 1590.97 | 31.73 | 0.82 | 9050.81 |

TABLE 4-continued

| Example | Total length of root (cm) | Total area of root surface (cm²) | Total volume of root (cm³) | Average root diameter (mm) | Number of root tips |
|---|---|---|---|---|---|
| Example 4 | 7633.36 | 1410.30 | 28.80 | 0.81 | 8562.09 |
| Example 5 | 10021.74 | 1919.90 | 39.97 | 0.85 | 10930.74 |
| Example 6 | 11259.31 | 2001.68 | 38.48 | 0.82 | 11154.45 |

Table 5 shows the effects of different granular fertilizers on the HLB pathogen bacteria content (Ct value) in navel orange roots, leaves and fruits.

TABLE 5

| Example | Number of samples (N) | First year | | | Second year | | | Third year | | |
|---|---|---|---|---|---|---|---|---|---|---|
| | | Root system | Midveins of leaves | Fruits | Root system | Midveins of leaves | Fruits | Root system | Midveins of leaves | Fruits |
| Example 7 (Control group) | 9.00 | 25.32 | 23.23 | 24.09 | 27.29 | 24.91 | 25.14 | 23.67 | 21.93 | 21.42 |
| Example 1 | 9.00 | 24.66 | 22.75 | 26.63 | 28.44 | 26.73 | 27.53 | 27.54 | 24.66 | 25.77 |
| Example 2 | 9.00 | 25.67 | 25.44 | 24.17 | 31.85 | 28.88 | 28.93 | 35.15 | 33.44 | 32.33 |
| Example 3 | 9.00 | 26.15 | 23.21 | 23.93 | 33.73 | 30.27 | 29.89 | 35.77 | 34.12 | 33.94 |
| Example 4 | 9.00 | 24.28 | 24.12 | 24.22 | 29.61 | 32.25 | 30.68 | 33.20 | 35.05 | 35.35 |
| Example 5 | 9.00 | 26.79 | 25.10 | 25.01 | 35.40 | 33.50 | 32.71 | 36.03 | 35.16 | 35.54 |
| Example 6 | 9.00 | 26.88 | 24.79 | 25.66 | 35.66 | 34.67 | 34.19 | 35.96 | 36.85 | 36.65 |

Note: The test result was displayed by the number of cycles experienced when a fluorescent signal in a reaction tube reaches a set threshold (i.e., the Ct value). A Ct value less than 35 indicates that the sample is positive for HLB, and a Ct value greater than 35 indicates that the sample is negative for HLB. The lower the Ct value is, the higher the content of HLB pathogenic bacteria is.

The following conclusions can be found from the data in Tables 2-5: (1) excessive application of manganese fertilizer can inhibit the number of HLB pathogenic bacteria in the root system of citrus; while the effect of normal amount of manganese fertilizer supplementation in Example 1 is not significant; (2) when nitrogen fertilizer, phosphorus fertilizer and potassium fertilizer are reduced by 30%-50%, a 300% increase of manganese fertilizer can better inhibit the number of HLB pathogenic bacteria in the root system; (3) a combined application of manganese fertilizer and boron fertilizer is much better than single application in inhibiting the content of citrus HLB pathogenic bacteria; and (4) in the case of 30%-50% reduction of nitrogen fertilizer, phosphorus fertilizer and potassium fertilizer, combined application of incremental boron fertilizer, manganese fertilizer and other trace elements can significantly restore the tree vigor of HLB-affected trees in the second year, and achieve high yield and high quality.

Example 9

A special water-soluble fertilizer was prepared, of which the raw material included, in parts by weight, 4.37 parts of ammonium polyphosphate, 9.4 parts of ammonium phosphorus nitrate, 17.4 parts of potassium nitrate, 10.5 parts of ammonium sulfate, 1.1 parts of urea, 14.5 parts of EDTA chelated calcium, 16.5 parts of calcium magnesium nitrate, 5 parts of citric acid, and 250 parts of straw vinegar concentrate (21.14% solid content).

Example 10

A special water-soluble fertilizer was prepared, of which the raw materials included, in parts by weight, 4.37 parts of ammonium polyphosphate, 9.4 parts of ammonium phosphorus nitrate, 17.4 parts of potassium nitrate, 10.5 parts of ammonium sulfate, 1.1 parts of urea, 14.5 parts of EDTA chelated calcium, 16.5 parts of calcium magnesium nitrate, 5 parts of citric acid, 0.35 part of Granubor®, and 250 parts of straw vinegar concentrate (21.14% solid content).

Example 11

A special water-soluble fertilizer was prepared, of which the raw materials may include, in parts by weight, 4.37 parts of ammonium polyphosphate, 9.4 parts of ammonium phosphorus nitrate, 17.4 parts of potassium nitrate, 10.5 parts of ammonium sulfate, 1.1 parts of urea, 14.5 parts of EDTA chelated calcium, 16.5 parts of calcium magnesium nitrate, 5 parts of citric acid, 1.77 parts of EDTA chelated manganese, 2.15 parts of manganese sulfate monohydrate, and 250 parts of straw vinegar concentrate (21.14% solid content).

Example 12

A special water-soluble fertilizer was prepared, of which the raw material may include, in parts by weight, 4.37 parts of ammonium polyphosphate, 9.4 parts of ammonium phosphorus nitrate, 17.4 parts of potassium nitrate, 10.5 parts of ammonium sulfate, 1.1 parts of urea, 14.5 parts of EDTA chelated calcium, 16.5 parts of calcium magnesium nitrate, 5 parts of citric acid, 1.77 parts of EDTA chelated manganese, 0.35 parts of Granubor®, 2.15 parts of manganese sulfate monohydrate, and 250 parts of straw vinegar concentrate (21.14% solid content).

Example 13

A special water-soluble fertilizer was prepared, of which the raw materials included, in parts by weight, 4.37 parts of ammonium polyphosphate, 9.4 parts of ammonium phosphorus nitrate, 17.4 parts of potassium nitrate, 10.5 parts of ammonium sulfate, 1.1 parts of urea, 14.5 parts of EDTA chelated calcium, 16.5 parts of calcium magnesium nitrate, 5 parts of citric acid, 0.35 part of Granubor®, 0.27 part of DTA chelated copper, 8.5 parts of DTA chelated iron, 1.77 parts of DTA chelated manganese, 4.8 parts of DTA chelated zinc, 2.15 parts of manganese sulfate monohydrate, 0.01 part of ammonium molybdate, 0.7 part of triclocarban, 2.8 parts of polyethylene glycol, and 250 parts of straw vinegar concentrate (21.14% solid content).

Example 14

A control group (CK) was set. A water-soluble fertilizer was prepared, of which the raw materials included, in parts by weight, 4.37 parts of ammonium polyphosphate, 9.4 parts of ammonium phosphorus nitrate, 17.4 parts of potassium nitrate, 10.5 parts of ammonium sulfate, 1.1 parts of urea, 14.5 parts of EDTA chelated calcium, 16.5 parts of calcium magnesium nitrate, 5 parts of citric acid, 250 parts of straw vinegar concentrate (7.86% solid content).

Example 15 Compassion Test of Water-Soluble Fertilizer in Examples 9-13 and Example 14

Contrast tests were carried out on the water-soluble fertilizers in Examples 9-13 and Example 14.

Test location: the self-made net of Fan's orchard in Jiaolin Village, Jiangkou Town, Ganxian District, Ganzhou City. The tests are continuously performed for 3 years at the location.

Test variety: Newhall navel orange. Age of tree: 5 years. All the trees used in the tests were HLB-infected.

During the test, each treatment may be repeated 3 times. There were 18 plots in total, with 6 navel orange trees in each plot. The plots were arranged in random blocks, and the first tree and the last tree in each plot were marked accordingly.

Time and method for applying the fertilizers: applying the fertilizer to the HLB-affected tree with a dose of 1.5 kg/plant once every 20 days from January every year; wherein the fertilizers were applied 11 times before the fruit enlargement period of the HLB-affected tree.

Sampling method: selecting four tree bodies with uniform growth from each plot for yield measurement sampling during a navel orange maturity stage every year, each tree being counted separately; collecting five navel orange fruits of uniform size from four different orientations of each tree and mixing into one sample to determine quality indexes and Ct values; mixing four root samples from different orientations of each tree into one sample to determine root morphological indexes and Ct values; and mixing twelve diseased leaves from four different orientations of each tree into one sample to determine Ct values of the midveins of the leaves.

The Ct values were measured by real-time fluorescent quantitative PCR, and the leaf, root and fruit samples were measured by real-time fluorescent quantitative PCR after DNA extraction. Primers used in real-time fluorescent quantitative PCR were HLBasf and HLBr, and a probe was HLBp. ddH2O and DNA extracted from healthy navel orange materials were used as a blank control and a negative control, respectively, and the DNA of navel oranges known to be infected was used as a positive control. A 20 μL fluorescent quantitative PCR amplification system contained: 10 μL Bestar qPCR Master Mix, 8 μL ddH2O, 0.4 μL HLBasf (10 μmol/L), 0.4 μL HLBr (10 μmol/L), 0.2 μL HLBp (5 μmol/L) and 1 μL DNA solution. PCR was performed using a Real-Time PCR instrument. The reaction conditions were: 95° C., 2 min, 95° C., 10 s; 60° C., 30 s, 40 cycles.

The root morphology was measured by a root scanner LA2400 and analyzed by a WinRHIZO analysis system. The fertilizer application details of the water-soluble fertilizer in each group is shown in Table 6.

TABLE 6

| Example No. | Purpose | Amount of each fertilization (kg/plant) |
|---|---|---|
| Example 14 (Control group) | Investigating the effect of the straw vinegar with the solid content less than or equal to 15% based on nitrogen fertilizer, phosphorus fertilizer, potassium fertilizer, calcium fertilizer and magnesium fertilizer | 15 |
| Example 9 | Investigating the effect of the straw vinegar with the solid content greater than or equal to 15% based on nitrogen fertilizer, phosphorus fertilizer, potassium fertilizer, calcium fertilizer and magnesium fertilizer | 1.5 |
| Example 10 | Investigating the interaction effect of the straw vinegar with the solid content greater than or equal to 15% and boron fertilizer based on nitrogen fertilizer, phosphorus fertilizer, potassium fertilizer, calcium fertilizer and magnesium fertilizer | 1.5 |
| Example 11 | Investigating the interaction effect of the straw vinegar with the solid content greater than or equal to 15% and manganese fertilizer based on nitrogen fertilizer, phosphorus fertilizer, potassium fertilizer, calcium fertilizer and magnesium fertilizer | 1.5 |
| Example 12 | Investigating the interaction effect of the straw vinegar with the solid content greater than or equal to 15%, manganese fertilizer and boron fertilizer based on nitrogen fertilizer, phosphorus fertilizer, potassium fertilizer, calcium fertilizer and magnesium fertilizer | 1.5 |
| Example 13 | Investigating the interaction effect of the straw vinegar with the solid content greater than or equal to 15%, manganese fertilizer, boron fertilizer, zinc fertilizer and other trace elements based on nitrogen fertilizer, phosphorus fertilizer, potassium fertilizer, calcium fertilizer and magnesium fertilizer | 1.5 |

Table 7 shows the effect results of the different water-soluble fertilizers on the yield of navel oranges.

TABLE 7

| Example | First year(kg/plant) | Second year(kg/plant) | Third year(kg/plant) |
|---|---|---|---|
| Example 14 (Control group) | 34.11 | 35.54 | 37.47 |
| Example 9 | 39.40 | 44.49 | 51.77 |
| Example 10 | 30.53 | 46.40 | 63.71 |
| Example 11 | 37.44 | 63.85 | 67.35 |
| Example 12 | 45.22 | 67.60 | 69.28 |
| Example 13 | 60.70 | 74.76 | 78.29 |

Table 8 shows the effect results of the different water-soluble fertilizers on the quality of navel oranges.

TABLE 8

| Example | Total sugar (%) | Soluble solid (%) | Titratable acid (%) | Vc (mg/100 g) | Edible rate (%) | Juice rate (%) | Solidity-acid ratio |
|---|---|---|---|---|---|---|---|
| Example 14 (Control group) | 7.96 | 8.50 | 0.50 | 41.73 | 62.60 | 37.73 | 17.11 |
| Example 9 | 8.64 | 9.50 | 0.51 | 44.38 | 67.21 | 41.88 | 18.63 |
| Example 10 | 9.40 | 12.50 | 0.55 | 48.61 | 70.73 | 46.73 | 22.80 |
| Example 11 | 10.92 | 13.00 | 0.55 | 49.66 | 72.86 | 47.09 | 23.48 |
| Example 12 | 11.55 | 14.50 | 0.57 | 52.36 | 75.31 | 50.94 | 25.51 |
| Example 13 | 12.13 | 15.00 | 0.58 | 54.13 | 77.68 | 52.74 | 25.86 |

Table 9 shows the effect results of the different water-soluble fertilizers on the root systems of navel oranges.

TABLE 9

| Example | Total length of root (cm) | Total area of root surface (cm$^2$) | Total volume of root (cm$^3$) | Average root diameter (mm) | Number of root tips |
|---|---|---|---|---|---|
| Example 14 (Control group) | 10413.81 | 2087.53 | 38.63 | 0.63 | 12602.02 |
| Example 9 | 12672.42 | 2309.55 | 41.40 | 0.80 | 14160.01 |
| Example 10 | 16128.06 | 2527.52 | 48.77 | 0.87 | 17567.69 |
| Example 11 | 17223.19 | 2988.51 | 54.06 | 0.92 | 18711.01 |
| Example 12 | 19663.34 | 3347.21 | 66.38 | 1.04 | 22258.53 |
| Example 13 | 20195.12 | 3525.36 | 68.97 | 1.05 | 23813.70 |

Table 10 shows the effect results of the different water-soluble fertilizers on the HLB pathogen bacteria content (Ct value) in navel orange roots, leaves and fruits.

TABLE 10

| Example | Number of samples (N) | First year Root system | First year Midveins of leaves | First year Fruits | Second year Root system | Second year Midveins of leaves | Second year Fruits | Third year Root system | Third year Midveins of leaves | Third year Fruits |
|---|---|---|---|---|---|---|---|---|---|---|
| Example 14 (Control group) | 12.00 | 23.27 | 20.67 | 22.32 | 26.44 | 23.35 | 25.16 | 27.06 | 26.93 | 28.11 |
| Example 9 | 12.00 | 28.28 | 26.43 | 24.25 | 31.06 | 30.67 | 29.50 | 33.91 | 32.36 | 30.30 |
| Example 10 | 12.00 | 24.64 | 25.71 | 24.51 | 28.09 | 31.54 | 32.15 | 35.97 | 35.15 | 35.11 |
| Example 11 | 12.00 | 31.45 | 29.57 | 28.46 | 35.76 | 35.02 | 34.45 | 35.03 | 36.89 | 35.13 |
| Example 12 | 12.00 | 34.11 | 32.54 | 30.17 | 35.67 | 35.76 | 35.17 | 35.59 | 35.54 | 36.28 |
| Example 13 | 12.00 | 35.12 | 35.04 | 35.07 | 35.90 | 35.79 | 35.48 | 35.91 | 36.80 | 36.76 |

Note: The test results were displayed by the number of cycles experienced when a fluorescent signal in a reaction tube reaches a set threshold (i.e., the Ct value). A Ct value less than or equal to 35 indicates that the sample is positive for HLB, and a Ct value greater than 35 indicates that the sample is negative for HLB. The lower the Ct value is, the higher the content of HLB pathogenic bacteria is.

The following conclusions are found from the data in Tables 7-10: (1) the straw vinegar with the solid content greater than or equal to 15% can reduce the number of HLB pathogenic bacteria in the root system; and the straw vinegar (CK) with the solid content less than 15% has no obvious effect; (2) a combined application of the straw vinegar with the solid content greater than 15% and excessive manganese fertilizer has a better inhibitory effect on the number of citrus HLB pathogenic bacteria than single application. The results of field experiments show that the combined application of the straw vinegar with the solid content greater than or equal to 15% and excessive manganese fertilizer can effectively inhibit the number of HLB pathogenic bacteria in the root system, and HLB pathogenic bacteria in the root system were detected to be negative in the second year of application, obviously restoring the tree vigor, and achieving high yield and high quality; and (3) combined application of the straw vinegar with the solid content greater than or equal to 15% and triclocarban, boron fertilizer, manganese fertilizer and other trace elements can make HLB pathogenic bacteria of the HLB-affected tree negative in the first year, significantly restoring the tree vigor, and achieving high yield and high quality in the same year.

The above descriptions are only preferred embodiments of the present disclosure, and the present disclosure is not limited to the embodiments, as long as they achieve the same technical effects of the present disclosure by the same means, shall fall within the protection scope of the present disclosure. Various modifications and alterations may be made to the technical solutions and/or embodiments within the protection scope of the present disclosure.

What is claimed is:

1. A water-soluble fertilizer for delaying decay of a Huanglongbing (HLB)-affected tree, the water-soluble fertilizer comprising, in parts by weight, 3-5.5 parts of ammonium polyphosphate, 7.0-12 parts of ammonium nitrate phosphate, 13-22 parts of potassium nitrate, 7.5-13.5 parts of ammonium sulfate, 0.8-1.5 parts of urea, 10.5-18 parts of ethylene diamine tetraacetic acid (EDTA) chelated calcium, 12-21 parts of calcium magnesium nitrate, 3.5-7 parts of citric acid, and 150-400 parts of straw vinegar with a solid content of the straw vinegar being greater than or equal to 15%;

1.3-2.5 parts of EDTA chelated manganese, 1.5-3 parts of manganese sulfate monohydrate, and 0.25-0.5 part of disodium tetraborate pentahydrate.

2. The water-soluble fertilizer of claim 1, wherein the straw vinegar is rice straw vinegar, wheat straw vinegar, corn straw vinegar, or rice husk vinegar.

3. The water-soluble fertilizer of claim 1, further comprising 0.2-0.4 part of EDTA chelated copper, 6-10.5 part of EDTA chelated iron, 0.01-0.02 part of ammonium molybdate heptahydrate, 3.5-6 parts of EDTA chelated zinc, 0.5-2 parts of triclocarban, and 2-3.5 parts of a solubilizer.

4. The water-soluble fertilizer of claim 3, wherein the solubilizer is alcohol ethoxylates (AEO), polyethylene glycol, or alkylphenol ethoxylates.

5. A method of preparing a water-soluble fertilizer, the method comprising:

(i) dissolving ammonium polyphosphate, ammonium nitrate phosphate, potassium nitrate, ammonium sulfate, urea, ethylene diamine tetraacetic acid (EDTA) chelated calcium, calcium magnesium nitrate, citric acid, disodium tetraborate pentahydrate, EDTA chelated copper, EDTA chelated iron, EDTA chelated manganese, EDTA chelated zinc, manganese sulfate monohydrate, and ammonium molybdate in straw vinegar to obtain a first solution; and (ii) dissolving triclocarban in a solubilizer to obtain a second solution, dissolving the second solution in the first solution obtained in step (i) by stirring to obtain a third solution, and filtering the third solution to obtain the water-soluble fertilizer.

\* \* \* \* \*